United States Patent Office 2,851,495
Patented Sept. 9, 1958

2,851,495
DI(AMIDINOPHENYL)HYDRAZONES

Heinrich Jensch, Frankfurt am Main, Heinz Loewe, Kelkheim (Taunus), and Friedrich Bauer, Frankfurt am Main, Germany, assignors to Farbwerke Hoechst Aktiengesellschaft vormals Meister Lucius & Brüning, Frankfurt am Main, Germany, a corporation of Germany No Drawing. Application June 26, 1956
Serial No. 593,831

Claims priority, application Germany July 6, 1955

5 Claims. (Cl. 260—564)

The present invention relates to basically substituted phenylhydrazones of the general formula

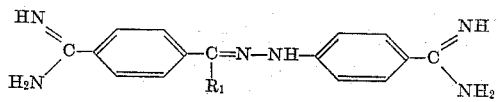

wherein $R_1$ represents hydrogen or an alkyl group of low molecular weight, to the acid addition salts thereof and to a process of preparing these compounds. The invention especially relates to compounds having the above-mentioned formula, wherein $R_1$ represents hydrogen or a methyl group and to the salts of these compounds with acylamino acids and hydrohalic acids.

It is known that aromatic diamidines of the general formula

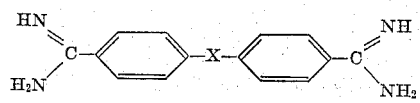

are chemotherapeutically effective and that they have an excellent efficiency against trypanosomes, especially when X represents the grouping —O—$(CH_2)_n$—O— (J. Chem. Soc. London, 1942, pages 103 et seq.). If the bridge between the two benzene nuclei also contains nitrogen atoms, for example in the case of the structures

NH—CO—NH—, —NH—$CH_2$—$CH_2$—O— or

—N=N— this effect is lost. Contrary thereto it is described in German Patent 878,651 the surprising fact that, when the aromatic diamidines are linked by a triazene chain, compounds are formed which are very active against blood parasites.

Now we have found that corresponding compounds wherein the two benzene nuclei are linked by a hydrazone chain have a similar effect. In contrast with the known di-(amidino-pheyl)-triazenes the new compounds, which are relatively unstable in solutions, have the advantage that the aqueous solutions of the salts thereof are stable for a practically unlimited time even at temperatures up to 60° C.

The present invention relates to the preparation of such chemotherapeutically active, basically substituted phenylhydrazones and the salts thereof by converting in the usual manner into amidino groups the nitrile groups in compounds of the general formula

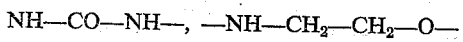

wherein $R_1$ represents a hydrogen atom or an alkyl group of low molecular weight and, and by converting, if desired, the p-amidinophenylhydrazones obtained into the corresponding salts with the aid of inorganic or organic acids.

The dinitriles used according to the invention as starting material can be prepared, for example by converting carbonyl compounds of the formula

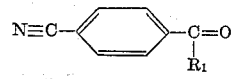

into the corresponding dinitrile-phenylhydrazone with free p-cyano-phenylhydrazine in an alcoholic medium or with a mineral acid salt of the p-cyano-phenylhydrazine, preferably with the corresponding hydrochloride in aqueous alcohols in the presence of a carboxylic acid of low molecular weight and the alkali metal salt thereof acting as buffer. (J. Chem. Soc. London, 1953, page 3884.)

The reaction according to the process of the invention can take place via the corresponding iminoethers by saturating a mixture of the dinitriles and an aliphatic or cycloaliphatic anhydrous alcohol, preferably used in excess, or another compound containing alcoholic groups, preferably aliphatic groups, with hydrogen chloride or bromide. As alcohols are mentioned, for example, methanol, ethanol, propanol, n-butanol, isobutanol, methylglycolic ether, 3-methoxybutanol, and cyclohexanol. It is possible to work at room temperature as well as at moderately reduced or raised temperature.

For better separating the formed iminoether salts it is advantageous to add, before starting or during the reaction, an indifferent diluent, such as absolute ether, chloroform or nitrobenzene.

The conversion of the iminoether into the corresponding amidino compound can take place, for example, by treating the iminoether salt with an alcoholic ammonia solution, suitably at a raised temperature, whereby, after the evaporation of the solvent, the corresponding hydrohalic acid salt of the amidine remains, from which, by stirring with bases, the free amidine base is obtained, which can be converted into the corresponding salts with the aid of inorganic or organic acids. As acids which may be used, there may be mentioned especially hydrohalic acids, aminosulfonic acids, hydroxyalkanesulfonic acids, formic acid, acetic acid and their homologues of low molecular weight, acylamino acids, or lactic acid.

The formation of salt can also take place by setting free the free imino ether bases of the iminoether salt with the aid of alkalies, separating them in a solvent not miscible with water from the reaction mixtures obtained and, subsequent to the evaporation of the solvent, reacting the residue, expediently in an alcoholic solution, with a concentrated aqueous solution of the ammonium salt of the acid desired for the formation of the salt.

The compounds obtained and corresponding to the general formula

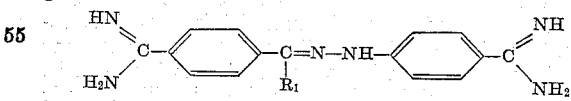

wherein $R_1$ represents a hydrogen atom or an alkyl group of low molecular weight represent, especially in the form of the corresponding salts with inorganic or organic acids valuable chemotherapeutic remedies and they have an excellent efficiency especially against trypanosoma congelense, brucei, gambiense and rhodesiense, against babesia canis and a distinct efficiency against streptococcal infections. They are very efficient in vitro as well as in vivo against brucella. The 4-amidino-benzaldehyde-4'-amidino-phenyl-hydrazone, for example, has a retarding action on the growth of different brucella strains in dilutions of about 1:10,000,000, whereas with small animals, for example the mouse or the "*Cricetus auratus*" doses of 0.5 mg. per 20 g. of body weight are sufficient for the treatment in the case of subcutaneous application.

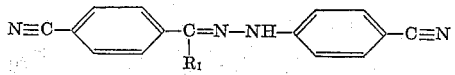

The curative dose of the 4-amidino-acetophenone-4'-amidino-phenylhydrazone in the case of infection congelense of the mouse is 0.05 mg./20 g. This compound retards the growth of different brucella strains in dilutions of 1:10,000,000 and doses of 0.7 mg./20 g. (corresponding to ⅓ of the dos. tol.) in the case of brucella infection of the mouse cause more than half of the animals to survive.

The following examples serve to illustrate the invention but they are not intended to limit it thereto.

Example 1

A current of dry hydrogen chloride is passed for several hours at about 50° C. through a suspension of 5 g. of p-cyano-benzaldephyde - p' - cyano - phenylhydrazone (obtained by reacting p-cyano-benzaldehyde with p-cyano-phenylhydrazine) in 100 ml. of methylglycolic ether, whereby at first a limpid solution but then a consistent crystal magma is formed. Subsequent to standing over night at room temperature, the excess of hydrochloric acid is removed by evacuating and the precipitation of the imino ether hydrochloride is completed by adding absolute ether. The reaction product is filtered off with suction and washed with a little ether. The imino ether hydrochloride is introduced in 250 ml. of a saturated ethyl-alcoholic ammonia solution and the reaction product is kept for some time in the ammonia current at about 50° C. The solvent is then evaporated under reduced pressure and the dry residue is triturated with dilute sodium hydroxide solution. The free 4-amidino-benzaldehyde-4'-amidino-phenyl-hydrazone (4.6 g.) obtained is washed with water free of chloride ions. The decomposition point of the base recrystallized from a mixture of water and methanol is at about 200° C.

In order to convert the product into the aceturate which is more readily soluble, 1.4 g. of the base are dissolved in 5 ml. of methanol and a solution of 1.35 g. of aceturic acid in 25 ml. of methanol is added. After standing for several hours in the refrigerator, 1.8 g. of 4-amidino-benzaldehyde-4' - amidino - phenylhydrazone-diaceturate separate which decompose subsequent to recrystallizing from a mixture of methanol and water at 246° C. while swelling up violently.

Example 2

5 g. of p-cyano-benzaldehyde-p'-cyano-phenylhydrazone are suspended in 150 ml. of absolute ethyl alcohyl and the suspension is saturated with dry hydrogen chloride gas while cooling with ice. The reaction mixture is allowed to stand for 1 to 2 weeks. The main part of hydrogen chloride is then removed by filtering off with suction under reduced pressure and the formed imino ether hydrochloride is completely separated by adding absolute ether; it is then filtered with suction and washed with a little ether.

In order to obtain the 4-amidino-benzaldehyde-4'-amidino-phenylhydrazone the material is treated as described in Example 1. Small amounts of the starting material which may still be present in the base can be removed by dissolving the crude base in dilute acetic acid and by filtering the solution so obtained.

Example 3

5 g. of p-cyano-benzaldehyde-p'-cyano-phenylhydrazone are converted into the imino ether hydrochloride according to the description given in Example 1 with the aid of 100 ml. of methylglycolic ether. The reaction product is suspended in chloroform and to the suspension are added pieces of ice. A concentrated solution of sodium hydroxide is added, while stirring, until alkaline reaction occurs, the organic layer is separated and washed several times with water and the solvent is removed under reduced pressure at about 30° C. subsequent to drying.

The crude imino ether base is absorbed in 15 ml. of alcohol and a solution of 9 g. of ammonium aceturate in 5 ml. of water and 10 ml. of ethyl alcohol is added at about 70° C., while stirring. After a short time there separates a consistent yellow crystal magma of 4-amidino-benzaldehyde-4'-amidino-phenylhydrazone-diaceturate.

Example 4

2.5 g. of p-cyano-acetophenone-p'-cyano-phenylhydrazone (melting point 242° C. with decomposition, obtained by reacting p-cyano-acetophenone with p-cyano-phenylhydrazine) are suspended in 10 ml. of methylglycolic ether and the suspension is saturated at 0° C. with dry hydrogen chloride gas. Temporarily a limpid solution is formed, but soon a consistent crystal magma of the iminoether-hydrochloride separates, which, after standing for 2 days, is filtered off with suction and washed with absolute ether.

In order to convert the imino ether hydrochloride into the corresponding amidine it is introduced into 50 ml. of a saturated ethylalcoholic ammonia solution, and subsequent to standing for 3 days the solution is concentrated by evaporation at room temperature until it is dry. The residue is taken up in a little water, clarified with charcoal and filtered. Acetone is added to the filtrate until turbidity occurs. After standing over night in the refrigerator the dihydrochloride of the 4-amidino-acetophenone-4'-amidino-phenylhydrazone separates in the form of crystals. The decomposition point is above 250° C.

We claim:

1. Compounds selected from the group cvonsisting of basically substituted phenylhydrazones of the general formula:

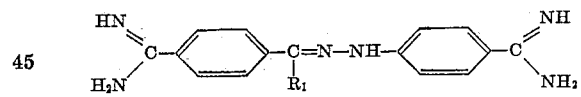

wherein $R_1$ is a member selected from the group consisting of hydrogen and alkyl groups having at most 4 carbon atoms, and acid addition salts of these compounds.

2. The 4-amidino-benzaldehyde-4' - amidino - phenylhydrazone.

3. The 4-amidino-benzaldehyde-4' - amidino - phenylhydrazone-diaceturate.

4. The 4-amidino-acetophenone - 4' - amidino - phenylhydrazone.

5. The 4-amidino-acetophenone-4'-amidino-phenylhydrazone-dihydrochloride.

References Cited in the file of this patent

Ashley et al.: Journal of the Chemical Society (London) 1953), pages 3881–3888.

Ashley et al.: Journal of the Chemical Society (London) (1942), pages 103–116.